(12) United States Patent
Kim et al.

(10) Patent No.: US 11,157,228 B2
(45) Date of Patent: Oct. 26, 2021

(54) DISPLAY APPARATUS AND CONTROL METHOD THEREOF

(71) Applicant: SAMSUNG ELECTRONICS CO., LTD., Suwon-si (KR)

(72) Inventors: Sangwon Kim, Suwon-si (KR); Jeongryeol Seo, Suwon-si (KR); Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/835,960

(22) Filed: Mar. 31, 2020

(65) Prior Publication Data

US 2021/0048969 A1 Feb. 18, 2021

(30) Foreign Application Priority Data

Aug. 13, 2019 (KR) .......................... 10-2019-0099115

(51) Int. Cl.
*G06F 3/14* (2006.01)
*G09G 5/12* (2006.01)

(52) U.S. Cl.
CPC .......... *G06F 3/1446* (2013.01); *G06F 3/1454* (2013.01); *G09G 5/12* (2013.01)

(58) Field of Classification Search
CPC ........ G06F 3/1446; G06F 3/1454; G09G 5/12
See application file for complete search history.

(56) References Cited

U.S. PATENT DOCUMENTS

| 10,275,202 | B2 | 4/2019 | Jo et al. |
| 10,409,544 | B2 | 9/2019 | Park et al. |
| 2009/0147028 | A1 | 6/2009 | Sefton et al. |
| 2015/0279268 | A1 | 10/2015 | Ganim et al. |
| 2016/0358582 | A1 | 12/2016 | Lee et al. |
| 2017/0038928 | A1 | 2/2017 | Park et al. |
| 2018/0046424 | A1 | 2/2018 | Jo et al. |

(Continued)

FOREIGN PATENT DOCUMENTS

| CN | 108320714 A | 7/2018 |
| JP | 2015-200806 A | 11/2015 |

(Continued)

OTHER PUBLICATIONS

Hu, "Brightness uniform display method and device applied to liquid crystal splicing screen" machine translation from Espacenet, Jul. 24, 2018 (Year: 2018).*

(Continued)

*Primary Examiner* — Peter D McLoone
(74) *Attorney, Agent, or Firm* — Sughrue Mion, PLLC

(57) ABSTRACT

Disclosed is a display apparatus and a control method thereof. The display apparatus includes a display group including a master display module and a plurality of slave display modules coupled by a Daisy Chain method, a first sensor equipped on the master display module, a second sensor equipped on at least one from the plurality of slave display modules, and a processor included in the master display module. The processor is configured to, based on sensing data obtained from the second sensor being received by the master display module through the Daisy Chain method, provide the received sensing data and sensing data obtained through the first sensor to an external apparatus.

20 Claims, 11 Drawing Sheets

(56) References Cited

U.S. PATENT DOCUMENTS

2018/0357034 A1 12/2018 Lee
2018/0373482 A1 12/2018 Park et al.

FOREIGN PATENT DOCUMENTS

| JP | 2018-22081 A | 2/2018 |
| JP | 2018-87944 A | 6/2018 |
| JP | 6448209 B2 | 1/2019 |
| KR | 10-1997-0050076 A | 7/1997 |
| KR | 10-2015-0118516 A | 10/2015 |
| KR | 10-2016-0098006 A | 8/2016 |
| KR | 10-2019-0001094 A | 1/2019 |

OTHER PUBLICATIONS

EP Search Report dated Sep. 28, 2020 by the European Patent Office in counterpart European Patent Application No. 20166252.5.
International Search Report (PCT/ISA/210) dated Oct. 16, 2020 by the International Searching Authority in counterpart International Patent Application No. PCT/KR2020/009191.
Written Opinion (PCT/ISA/237) dated Oct. 16, 2020 by the International Searching Authority in counterpart International Patent Application No. PCT/KR2020/009191.

* cited by examiner

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0099115, filed on Aug. 13, 2019, in the Korean Intellectual Property Office, the disclosure of which is incorporated by reference herein in its entirety.

BACKGROUND

1. Field

The disclosure relates to a display apparatus including a sensor and a control method thereof.

2. Description of the Related Art

Recently, various electronic apparatuses corresponding to the needs of consumers are being developed with the development of electronic technology. In particular, large format display apparatuses, in which a plurality of display modules are coupled, are recently being developed.

In a related art, one sensor is used in the display apparatus to understand the state of the display apparatus or the surrounding condition of the display apparatus. However, in the case of a large format display, since there are limitations on the recognition range with only one sensor, there are difficulties in accurately sensing the display apparatus or the surrounding conditions.

SUMMARY

Provided are a display apparatus and a control method thereof, the display apparatus being equipped with a plurality of sensors and transmitting sensing data obtained from the plurality of sensors to an electronic apparatus.

Additional aspects will be set forth in part in the description which follows and, in part, will be apparent from the description, or may be learned by practice of the presented embodiments.

In accordance with an aspect of the disclosure, there is provided a display apparatus including: a first display group including a first master display module and a plurality of first slave display modules coupled by a Daisy Chain method; a first sensor equipped on the first master display module; a second sensor equipped on at least one of the plurality of first slave display modules; and a processor included in the first master display module, wherein the processor is configured to, based on second sensing data obtained from the second sensor being received by the first master display module through the Daisy Chain method, provide, to an external apparatus, the received second sensing data and first sensing data obtained through the first sensor.

The display apparatus may include: a second display group including a second master display module and a plurality of second slave display modules, wherein the second master display module and the plurality of second slave modules are not equipped with a sensor.

The display apparatus may further include: a third display group including a third master display module and a plurality of third slave display modules; a third sensor equipped on the third master display module; and a fourth sensor equipped on at least one of the plurality of third slave display modules, wherein the first display group and the third display group are arranged on opposite edge areas of the display apparatus.

The first master display module may include: a memory; and the processor, wherein the processor may be further configured to: control to store the first sensing data obtained from the first sensor in the memory, control to transmit a request signal for the second sensing data obtained from the second sensor to at least one of the first slave display modules at a first time interval, and control to store the received second sensing data in the memory.

The processor may be further configured to, based on receiving from the external apparatus at a second time interval a request signal for sensing data, control to transmit the stored first sensing data and the stored second sensing data to the external apparatus, and wherein the first time interval may be equal to or shorter than the second time interval.

The processor may be further configured to: control to store the first sensing data obtained from the first sensor in a first area of the memory; control to store the received second sensing data in a second area of the memory; and provide, to the external apparatus, identification of the first sensing data stored in the first area as sensing data corresponding to the first sensor and the second sensing data stored in the second area as sensing data corresponding to the second sensor.

The first sensor and the second sensor may include at least one of an illuminance sensor, a temperature sensor, a humidity sensor, a motion sensor or an Infrared (IR) sensor; and the first sensing data and the second sensing data may include at least one of an illuminance data, a temperature data, a humidity data, a motion data or an IR data.

The first sensing data may include identification information of the first sensor and the second sensing data may include identification information of the second sensor.

The first sensor may be attachable to and detachable from the first master display module, and the second sensor may be attachable to and detachable from the at least one of the plurality of first slave display modules.

Each of the first master display module and the plurality of first slave display modules may be implemented as a light emitting diode (LED) cabinet including a plurality of LED devices.

In accordance with another aspect of the disclosure, a control method of a display apparatus including a first display group including a first master display module and a plurality of first slave display modules coupled by a Daisy Chain method, includes: obtaining first sensing data through a first sensor equipped in the first master display module; receiving, in the first master display module through the Daisy Chain method, second sensing data obtained from a second sensor equipped in at least one of the plurality of first slave display modules; and based on receiving, by the first master display module, the second sensing data, providing the received second sensing data and the obtained first sensing data to an external apparatus.

The display apparatus may further include a second display group including a second master display module and a plurality of second slave display modules; and the second master display module and the plurality of second slave modules are not equipped with a sensor.

The display apparatus may further include a third display group including a third master display module and a plurality of third slave display modules, a third sensor equipped on the third master display module, and a fourth sensor equipped on at least one of the plurality of third slave display modules; and the first display group and the third display group may be arranged on opposite edge areas of the display apparatus.

The obtaining the first sensing data may include storing the first sensing data in the master display module; and the receiving the second sensing data may include: transmitting a request signal for the second sensing data obtained from the second sensor to at least one of the first slave display modules at a first time interval, and storing the received second sensing data in the master display module.

The providing to the external apparatus may include, based on receiving from the external apparatus at a second time interval a request signal for sensing data, transmitting the stored first sensing data and the stored second sensing data to the external apparatus; and the first time interval may be equal to or shorter than the second time interval.

The obtaining the first sensing data may include storing the first sensing data in a first area of a memory included in the first master display module; the receiving the second sensing data may include storing the received second sensing data in a second area of the memory; and the providing to the external apparatus may include providing, to the external apparatus, identification of the first sensing data stored in the first area as sensing data corresponding to the first sensor and the second sensing data stored in the second area as sensing data corresponding to the second sensor.

The first sensor and the second sensor may include at least one of an illuminance sensor, a temperature sensor, a humidity sensor, a motion sensor or an Infrared (IR) sensor; and the first sensing data and the second sensing data may include at least one of an illuminance data, a temperature data, a humidity data, a motion data or an IR data.

The first sensing data may include identification information of the first sensor and the second sensing data may include identification information of the second sensor.

The first sensor may be attachable to and detachable from the first master display module, and the second sensor may be attachable to and detachable from the at least one of the plurality of first slave display modules.

Each of the first master display module and the plurality of first slave display modules may be implemented as a light emitting diode (LED) cabinet including a plurality of LED devices.

In accordance with another aspect of the disclosure, a master display module may include: a memory storing at least one instruction; and a processor configured to execute the at least one instruction to: obtain first sensing data through a first sensor attached to the master display module, receive, through a Daisy Chain method, second sensor data of a second sensor from a slave display module, and provide, to an external apparatus, the received second sensing data and the obtained first sensing data.

The master display module may further include the first sensor that is an attachable and detachable sensor.

The processor may be further configured to execute the at least one instruction to: control to store the first sensing data obtained from the first sensor in the memory, control to transmit a request signal for the second sensing data to the slave display module at a first time interval, and control to store the received second sensing data in the memory.

The processor may be further configured to execute the at least one instruction to, based on receiving from the external apparatus at a second time interval a request signal for sensing data, control to transmit the stored first sensing data and the stored second sensing data to the external apparatus, and the first time interval may be equal to or shorter than the second time interval.

The processor may be further configured to: control to store the first sensing data obtained from the first sensor in a first area of the memory; control to store the received second sensing data in a second area of the memory; and provide, to the external apparatus, identification of the first sensing data stored in the first area as sensing data corresponding to the first sensor and the second sensing data stored in the second area as sensing data corresponding to the second sensor.

The first sensing data may include identification information of the first sensor and the second sensing data may include identification information of the second sensor.

In accordance with another aspect of the present disclosure, a non-transitory computer-readable recording medium has recorded thereon at least one instruction executable by a processor to perform a control method of a display apparatus, the control method including: obtaining first sensing data through a first sensor equipped in a master display module; receiving, in the master display module through a Daisy Chain method, second sensing data obtained from a second sensor equipped in at least one of a plurality of slave display modules; and based on receiving, by the master display module, the second sensing data, providing the received second sensing data and the obtained first sensing data to an external apparatus.

Infrared

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
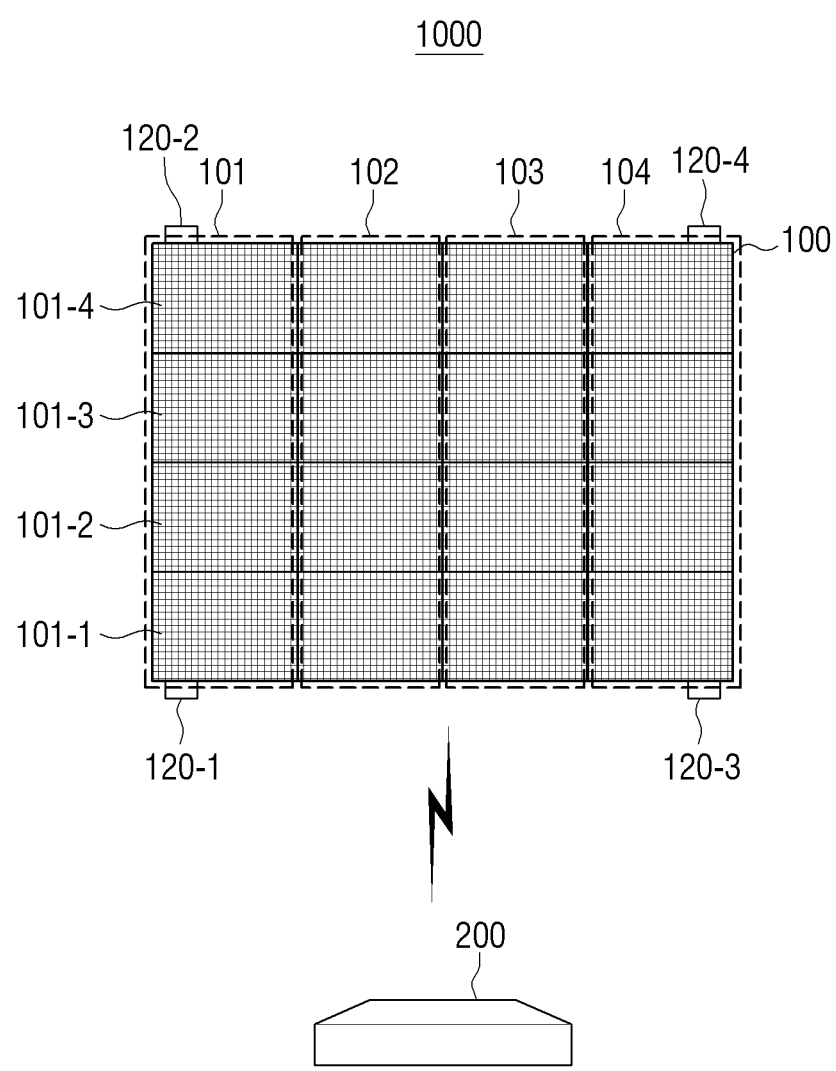
FIG. 1 is a diagram provided to schematically describe a configuration of an electronic system according to an embodiment.

The present disclosure will be described in detail herein with reference to the accompanying drawings.

Various modifications may be made to embodiments of the present disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but should be interpreted to include all modifications, equivalents or alternatives thereof. In describing the embodiments, based on determining that a detailed description of related known technologies may unnecessarily confuse the gist of the disclosure, the detailed description may be omitted.

A singular expression, unless otherwise specified, includes a plural expression. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

Expressions such at least one of A and/or B should be understood to represent "A" or "B" or any one of "A and B."

The terms "first," "second," or the like used herein may denote various components, regardless of order and/or importance, and may be used to distinguish one component from another, and does not limit the components.

Based on a certain element (e.g., first element) being indicated as being "(operatively or communicatively) coupled with/to" another element (e.g., second element) or "connected to," it is to be understood that the certain element may be directly coupled to another element or may be coupled through other element (e.g., third element).

Terms such as "module" or "unit" perform at least one function or operation, and may be implemented as hardware or software, or a combination of hardware and software. Further, a plurality of "modules" or a plurality of "units," except for a "module" or a "unit" required to be implemented as a specific hardware, may be integrated to one module and implemented as or by at least one processor. In the present disclosure, the term user may refer to a person using a display apparatus or an apparatus using a display apparatus (e.g., artificial intelligence display apparatus)

Embodiments of the present disclosure will be described in detail with reference to the accompanying drawings to assist those with ordinary knowledge in the technical field to which the present disclosure pertains to easily practice the disclosure. However, the present disclosure may be implemented in various different forms and is not limited to the various embodiments described herein. Further, in the drawings, like reference numerals indicating like elements may be affixed throughout the specification.

Embodiments of the disclosure will be more specifically described with reference to the accompanying drawings.

FIG. 1 is a diagram provided to schematically describe a configuration of an electronic system 1000 according to an embodiment.

Referring to FIG. 1, an electronic system 1000 according to an embodiment includes a display apparatus 100 and an electronic apparatus 200.

The display apparatus 100 may be implemented as a display apparatus in the form of a plurality of display modules 101-1, 101-2, 101-3, 101-4, etc., (e.g., displays) physically coupled. Herein, each of the plurality of display modules 101-1, 101-2, 101-3, 101-4, etc., may include a plurality of light emitting diode (LED) pixels arranged in a matrix form.

In addition, each of the plurality of display modules 101-1, 101-2, 101-3, 101-4, etc., may be implemented as an LED cabinet including a plurality of light emitting diode (LED) devices. Herein, the LED device may be implemented as an RGB LED, and the RGB LED may include a red LED, a green LED, and a blue LED. Further, the LED device may further include a White LED in addition to the RGB LED.

In addition, the LED device may be implemented as a micro LED, a self-emitting device. Herein, the micro LED is an LED of about 5 to 100 micrometer size, and is an ultra small light emitting diode that emits light on its own without a color filter.

The display apparatus 100 may be implemented as a television (TV), but is not limited thereto, and may be applied to any apparatus with a display function without limitation, such as a video wall, a large format display (LFD), a digital signage, a digital information display (DID), a projector display, or the like. Further, the display apparatus 100 may be implemented as a display of various forms such as a liquid crystal display (LCD), an organic light-emitting diode (OLED) display, a liquid crystal on silicon (LCoS) display, a digital light processing (DLP) display, a quantum dot (QD) display panel, a quantum dot light-emitting diodes (QLED) display, and a micro light-emitting diode (LED) display.

The electronic apparatus 200 may be an image processing apparatus providing control data for controlling video data or display module state to the display apparatus 100. For example, the electronic apparatus 200 may be implemented as a source box, a media box, a control box, a sending box, a set top box, or the like. Herein, the control data may include luminance information, contrast information, power on/off information, entering standby mode information, or the like.

The display apparatus 100 is equipped with a sensor 120 and the sensor 120 may be implemented as a plurality of sensors 120-1 to 120-4.

The display apparatus 100 may transmit sensing data obtained from a plurality of sensors 120 to the electronic apparatus 200. The sensor 120 may include at least one of an illuminance sensor, a temperature sensor, a humidity sensor, a motion sensor or an Infrared (IR) sensor, and is configured to sense the state of the display apparatus 100 and the surrounding condition of the display apparatus 100. The electronic apparatus 200 may, based on receiving sensing data from the display apparatus 100, transmit control data for performing an operation corresponding thereto to the display apparatus 100.

For example, a case of the display apparatus 100 being implemented as an outdoor signboard and the surrounding of the outdoor signboard at midday being very bright may be presumed. Sensing data obtained through the illuminance sensor equipped in the display apparatus 100 may be transmitted to the electronic apparatus 200, and the electronic apparatus 200 may transmit a control data for increasing luminance of the display apparatus 100 to improve visibility based on the received illuminance data to the display apparatus 100.

Based on the display apparatus 100 becoming larger in scale, a plurality of sensors 120 are equipped on the display apparatus 100 to sense a wide area, and the plurality of sensors 120 may be disposed spaced apart in the display apparatus so as to not overlap with one another and to sense a wide area. Accordingly, the plurality of sensors are disposed on different display modules from each other in the display apparatus 100. For example, in a case of four sensors 120-1, 120-2, 120-3, 120-4 being implemented, as illustrated in FIG. 1, the plurality of sensors 120-1, 120-2, 120-3, 120-4 may respectively be equipped in the display modules positioned at the top left side, the top right side, the bottom left side, and the bottom right side of the display apparatus 100.

Below, various embodiments on transmitting sensing data obtained through the plurality of sensors 120 disposed at different positions from each other to the electronic apparatus 200 are described in detail.

For the sake of convenience, the display modules coupled by a Daisy Chain method will be described as one group. The Daisy Chain method is a method in which a plurality of display modules are coupled in series, and data transmitted sequentially.

For example, a plurality of display modules of a 4×1 format may be coupled by a Daisy Chain method as one display group 101, 102, 103, 104 as shown in FIG. 1. That is, the four display modules 101-1, 101-2, 101-3 and 101-4 coupled in vertical format by the Daisy Chain method is one group 101, and the four groups 101, 102, 103 and 104 are coupled to be implemented as one display apparatus 100.

Figure 2:
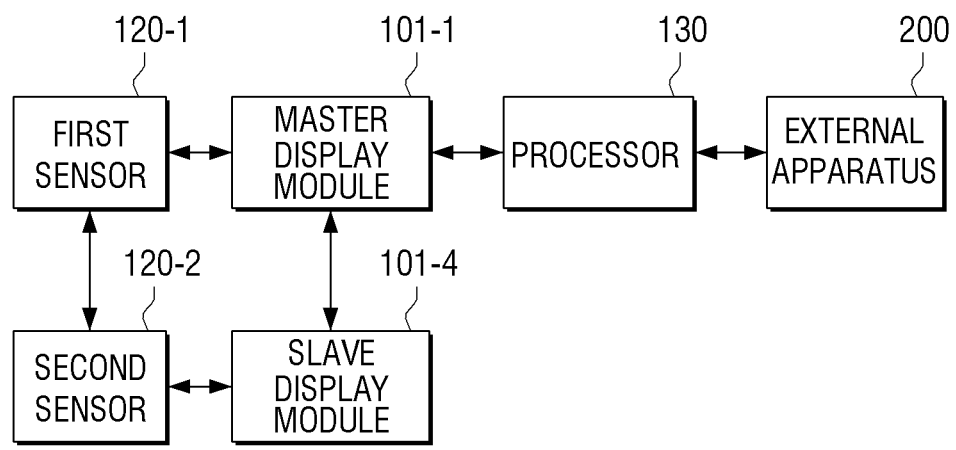
FIG. 2 is a block diagram provided to describe an operation of a display apparatus according to an embodiment.

FIG. 2 is a block diagram provided to describe an operation of a display apparatus 100 according to an embodiment.

Referring to FIG. 2, the display apparatus 100 includes a display, a first sensor 120-1, a second sensor 120-2, and a processor 130 (e.g., at least one processor).

The display includes a plurality of display modules. Specifically, the display may include a master display module 101-1 and a plurality of slave display modules 101-4 coupled by a Daisy Chain method.

Referring to FIG. 1 as an example, the display 100 according to the present disclosure may refer to one display group, in which a plurality of display modules of a 4×1 format are coupled. That is, the display apparatus 100 may include a plurality of displays. Herein the 4×1 format is merely an example, and the display group coupled by the Daisy Chain method may be modified and implemented in various formats (for example, 1×4).

The master display module may be a display module 101-1 equipped with a first sensor 120-1, and the slave module equipped with a second sensor 120-2 may be a display module 101-4 requesting sensing data obtained from the second sensor 120-2. Further, the master display module may transmit sensing data obtained from the first sensor 120-1 and the second sensor 120-2 to the external apparatus 200 (i.e., electronic apparatus 200). In the case of FIG. 1, the display module 101-1 is the master display module, and the display module equipped with the third sensor 120-3 may also be the master display module. The third sensor 120-3 is designated as the third sensor 120-3 for differentiation in the drawing but may actually be the same sensor as the first sensor 120-1.

In addition, the lowermost display module of the remaining display groups 102 and 103 may be designated as a master display module, and although may not transmit sensing data to the external apparatus 200, may first receive video data or control data from the external apparatus 200 and transmit to the remaining slave display modules.

The plurality of slave display modules may refer to the remaining display modules excluding the master display module in a group. The last slave display module from the plurality of slave display modules is equipped with the second sensor 120-2, and may transmit sensing data obtained by the second sensor 120-2 to the master display module through the Daisy Chain method, which is described in detail below.

The sensor 120 is configured to sense the state of the display apparatus 100 and the surrounding conditions of the display apparatus 100. The sensor 120 may include a first to fourth sensor 120-1, 120-2, 120-3 and 120-4. Here, the third sensor 120-3 and the fourth sensor 120-4 may substantially the same as the first sensor 120-1 and the second sensor 120-2.

The first sensor 120-1 and the second sensor 120-2 may include at least one of an illuminance sensor, a temperature sensor, a humidity sensor, a motion sensor or an Infrared (IR) sensor. Accordingly, the first sensor 120-1 and the second sensor 120-2 may sense at least one of illuminance data, temperature data, humidity data, motion data, or IR data from the display apparatus 100 and the surrounding area of the display apparatus 100, but are not limited thereto. The first sensor 120-1 and the second sensor 120-2 may be implemented as a sensor of various types such as a proximity sensor, an acceleration sensor, a gyroscope sensor, a geomagnetic sensor, a supersonic wave sensor, and an RF sensor.

The processor 130 is electrically coupled to the memory and controls the overall operation of the display apparatus 100.

According to an embodiment, the processor 130 may be implemented as at least one of a digital signal processor (DSP) for processing digital signals, a microprocessor, or a time controller (TCON), but are not limited thereto. The processor may include at least one of a central processing unit (CPU), a micro controller unit (MCU), a micro processing unit (MPU), a controller, an application processor (AP), a communication processor (CP), an ARM processor, or an artificial intelligence (AI) processor. Further, the processor 130 may be implemented as a system on chip (SoC) integrated with a processing algorithm, a large scale integration (LSI), or in the form of a field programmable gate array (FPGA). The processor 130, by executing computer executable instructions stored in the memory 140, may perform various functions.

The plurality of display modules are respectively equipped with processors, and the processor 130 according to an embodiment may refer to the processor included in the master display module.

The processor 130 according to an embodiment may obtain sensing data obtained through the first sensor 120-1.

In addition, the processor 130 in the master display module may receive sensing data obtained from the second sensor 120-2 equipped in at least one of the plurality of slave display modules through a Daisy Chain method. Herein, the Daisy Chain method, as a coupling method in series, is a communication coupling method in which sensing data is transmitted from the slave display module equipped with a second sensor 120-2 passing through the remaining slave modules to the master module sequentially. The Daisy Chain method is described in detail below with reference to FIG. 4.

Figure 4:
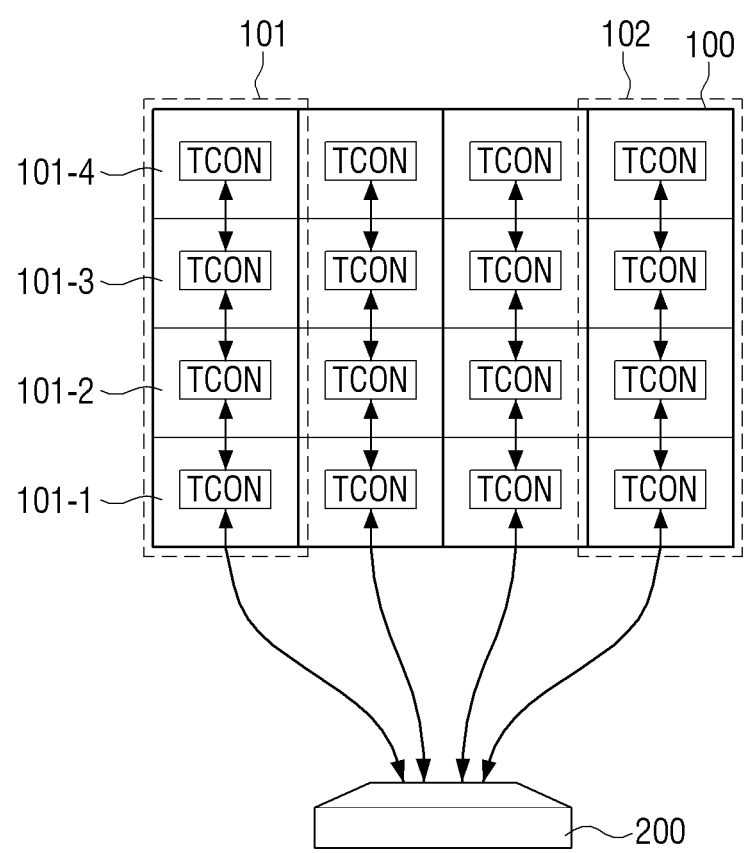
FIG. 4 is a diagram provided to describe a Daisy Chain method according to an embodiment.

FIG. 4 is a diagram provided to describe a Daisy Chain method according to an embodiment.

For example, data transmitted from the last slave display module 101-4 passes through the plurality of slave display modules 101-2 and 101-3 and is transmitted to the master display module 101-1, and the master display module 101-1 may transmit the received data to the external apparatus 200. Further the data transmitted from the external apparatus 200 may be received by the master display module 101-1, and the received data may be transmitted through the plurality of slave display modules 101-2 and 101-3 to the last slave display module 101-4.

The method in which data is sequentially transmitted such as the above is referred to as a Daisy Chain method. Data transfer according to the Daisy Chain method may be performed in each of the display groups.

Referring back to FIG. 2, the processor 130 in the master display module may receive, through the Daisy Chain method, sensing data obtained from the second sensor 120-2 equipped in at least one of the plurality of slave display modules.

Thereafter, the processor 130, based on the sensing data obtained from the second sensor 120-2 being received in the master display module, provides the received sensing data and sensing data obtained through the first sensor 120-1 to the external apparatus 200.

A detailed description of the above is described with reference to FIGS. 5 and 6.

Figure 5:
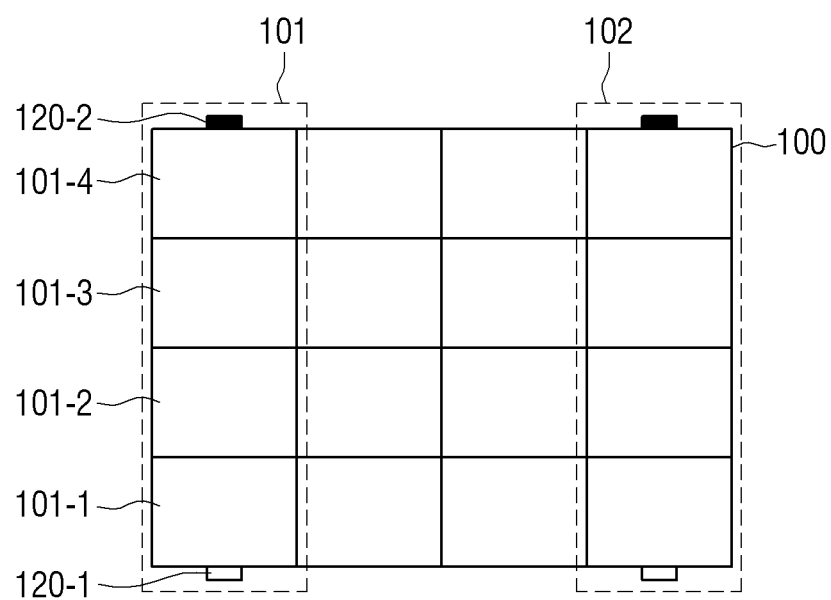
FIG. 5 is a diagram provided to describe a display apparatus including a plurality of sensors according to an embodiment.

FIG. 5 is a diagram provided to describe a display apparatus 100 including a plurality of sensors 120-1, 120-2 according to an embodiment.

The display apparatus 100 according to FIG. 5, assumes a case of one display group in which a plurality of display modules 101-1, 101-2, 101-3, 101-4 in a 4×1 format is coupled in plurality.

Based on the display referring to one display group, the display apparatus 100 includes a plurality of display groups respectively including a master display module and a plurality of slave display modules, and each of at least one master display module 101-1 and at least one slave display module (for example, last slave display module 101-4) included in a display group 101 from among the plurality of display groups may be equipped with a sensor, and each of the master display module and slave display module included in at least one other display group from among the plurality of display groups may not be equipped with a sensor.

Referring to FIG. 5, the display apparatus 100 includes four display groups, and the left display group 101 is referred to herein as a first group for the sake of convenience, and the right display group 102 is referred to herein as a second group.

The first group 101 may include the master display module 101-1 and the plurality of slave display modules 101-2, 101-3 and 101-4. The master display module 101-1 may include a first sensor 120-1, and the last slave module 101-4 from among the plurality of slave display modules 101-2, 101-3 and 101-4 may include a second sensor 120-2.

The second group 102 may also include a master display module and a plurality of slave display modules. The master display module may include a third sensor (substantially identical to first sensor), and the last slave module from among the plurality of slave display modules may include a fourth sensor (substantially similar to or identical with second sensor).

The remaining two groups other than the first group 101 and the second group 102 may include a master display module and a plurality of slave display modules but may not be equipped with a sensor. In other words, the plurality of sensors equipped in the first group 101 and the second group 102 senses the areas of the remaining two groups and thus the remaining two groups may not be equipped with a separate sensor.

The first group 101 and the second group 102 equipped with sensors to sense a wide range may be disposed on the outer parts of the display apparatus 100.

That is, the display modules 101-1, 101-2, 101-3, 101-4 included in the first group 101 from among the plurality of display groups may be arranged on a first edge area of the display apparatus 100, the display modules included in the second group 102 from among the plurality of display groups may be arranged on a second edge area opposite the first edge area, and each of the master and at least one slave module (for example, last slave module) included in the first group 101 and the second group 102 may be equipped with a sensor.

The transmitting method of sensing data of the first group 101 and the second group 102 is described in detail with reference to FIG. 6.

Figure 6:
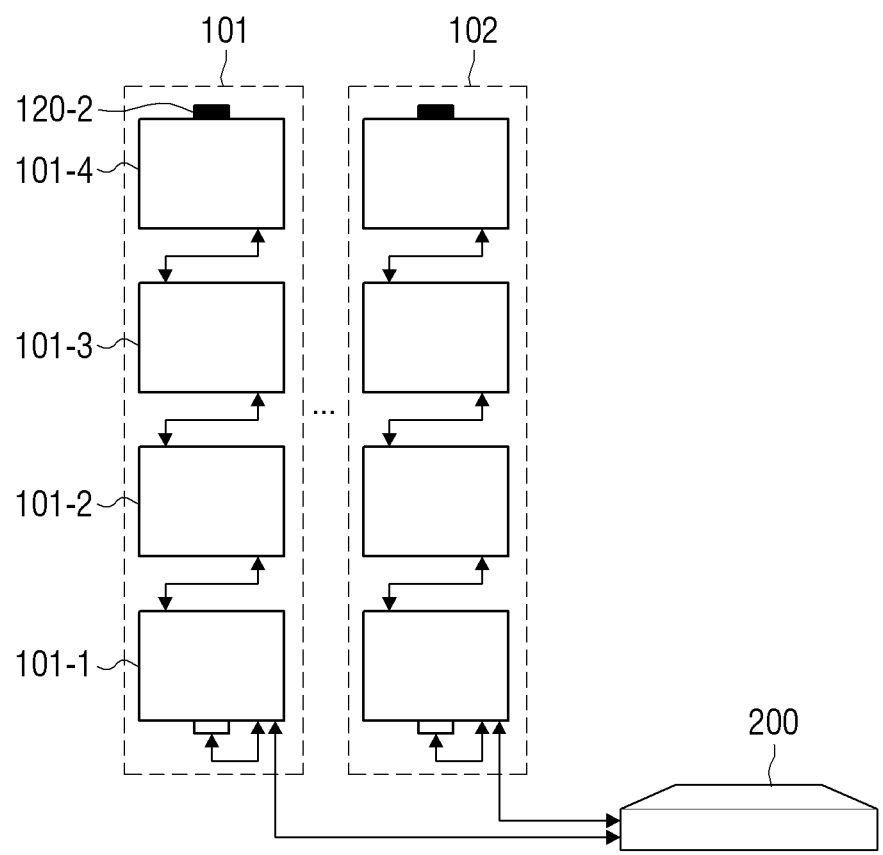
FIG. 6 is a diagram provided to describe a method of transmitting sensing data in a display group equipped with a sensor according to an embodiment.

FIG. 6 is a diagram provided to describe a method of transmitting sensing data in a display group equipped with a sensor according to an embodiment.

In order to describe the transmitting method of sensing data in FIG. 6, only the first group 101 and the second group 102 from among the plurality of display groups shown in FIG. 5 are illustrated for convenience of description.

In the transmitting method of sensing data in the first group 101, the processor 130 of the master display module 101-1 may obtain sensing data from the first sensor 120-1 equipped in the master display module 101-1. Specifically, the processor 130 may, through an inter-integrated circuit (I2C) communication method, obtain sensing data from the first sensor 120-1 and may store the obtained sensing data in a memory included in the master display module 101-1. For the sake of convenience, the memory of the master display module 101-1 will be disclosed as "memory" below.

The processor 130 may transmit a request signal for sensing data obtained from the second sensor 120-2 to at least one of the slave display modules. Specifically, the processor 130 may transmit the request signal for sensing data obtained from the second sensor 120-2 to the last slave module 101-4. The request signal transmitted by the processor 130 may be transmitted through the first slave module 101-2 and the second slave module 101-3 to the last slave module 101-4 according to the Daisy Chain method. According to an embodiment, the last slave module 101-4 may, based on receiving a request signal from the master display module 101-4, obtain sensing data from the second sensor 120-2 equipped on the last slave module 101-4. Specifically, the last slave module 101-4 may obtain sensing data from the second sensor 120-2 through an I2C communication method, and may transmit the obtained sensing data to the master display module 101-1. In this case, sensing data obtained from the second sensor 120-2 may be transmitted through the second slave module 101-3 and the first slave module 101-2 to the master display module 101-1. The processor 130 receives sensing data transmitted from the last slave module 101-4 and may store the received sensing data in the memory of the master display module 101-1.

According to another embodiment, the last slave module 101-4, regardless of whether a request signal for sensing data of the processor 130 has been received, may periodically (or continuously) obtain sensing data from the second sensor 120-2 and store in a memory included in the last slave module 101-4. The last slave module 101-4 may, based on receiving a request signal of the processor 130, transmit sensing data stored in the memory of the last slave module 101-4 to the master display module 101-1.

The processor 130 may, based on receiving from the external apparatus 200 a request signal for sensing data obtained from the first sensor 120-1 and the second sensor 120-2, transmit sensing data stored in the memory to the external apparatus 200.

The processor 130 may transmit the request signal for sensing data obtained from the second sensor 120-2 to the last slave module 101-4 at a first time interval, and the external apparatus 200 may transmit the request signal for sensing data obtained from the first sensor 120-1 and the second sensor 120-2 to the master display module 101-1 at a second time interval. Herein, the first time interval may be equal to or shorter than the second time interval. For example, the processor 130 may transmit a request signal for sensing data obtained from the second sensor 120-2 at 100 ms intervals, and the external apparatus 200 may transmit a request signal for sensing data obtained from the first sensor 120-1 and the second sensor 120-2 at 10 ms intervals. Accordingly, the probability of the external apparatus 200 obtaining the updated sensing data increases, and the electronic apparatus 200 may thereby transmit a control data close to (e.g., corresponding to) the current state to the display apparatus 100.

The second group 102 may also, in the same method as the first group 101, transmit sensing data to the external apparatus 200. Further, the master display module of the first group 101 and the second group 102 may synchronize the point in time in which a request signal for sensing data is transmitted to the last slave module of each group. In this case, sensing data obtained from sensors of the first group 101 and the second group 102 is data obtained from a most proximate point in time, and the external apparatus 200 may thereby more clearly identify the display apparatus 100 and the surrounding conditions of the display apparatus 100.

Referring back to FIG. 2, the processor 130 may store sensing data obtained from the first sensor 120-1 in a first area of the memory, and store sensing data received from at least one slave module in a second area of the memory. The processor 130 may, based on dividing a physical storage area of sensing data obtained from each sensor, easily identify the source of sensing data.

The processor 130 may thereafter identify sensing data stored in the first area and the second area as sensing data corresponding to the first sensor 120-1 and the second sensor 120-2, respectively, and provide to the external apparatus 200. For example, the processor 130 may, prior to transmitting the stored sensing data to the external apparatus 200, include identifying information with the sensing data stored in each area. Herein, identifying information may include at least one of an IP address, product name of sensor, a serial number, a manufacturer information, arrangement information, and the like.

Accordingly, the external apparatus 200, which received sensing data, may identify the source of each sensing data and transmit a control data therefrom to the display apparatus 100.

By way of example, a case of the external apparatus 200 storing arrangement position information of the first to fourth sensors 120-1 to 120-4 and an illuminance value included in one sensing data from among the received sensing data being relatively high may be assumed. In this case, the external apparatus 200 may, based on identifying the source of sensing data included with a relatively high illuminance value as the second sensor 120-2, transmit control data for relatively increasing a luminance value of the display module 101-4 equipped with the second sensor 120-2 and the surrounding display modules to the display apparatus 100.

Each sensing data obtained from the first sensor 120-1 and the second sensor 120-2 may include identifying information of the first sensor 120-1 and the second sensor 120-2 respectively. That is, each sensor may include and transmit identifying information indicating a source thereof with the obtained sensing data.

Each of the first sensor 120-1 and the second sensor 120-2 may be a sensor that is attachable to and detachable from the master display module or at least one slave display module, and are described below with reference to FIGS. 9 and 10.

The drawings in the present disclosure illustrate a display apparatus 100 including a plurality of display modules in a 4×4 format, but this is merely one example. It is understood that one or more other embodiments are not limited thereto and may be implemented variously such as in a 2×2 format or the like.

Figure 3:
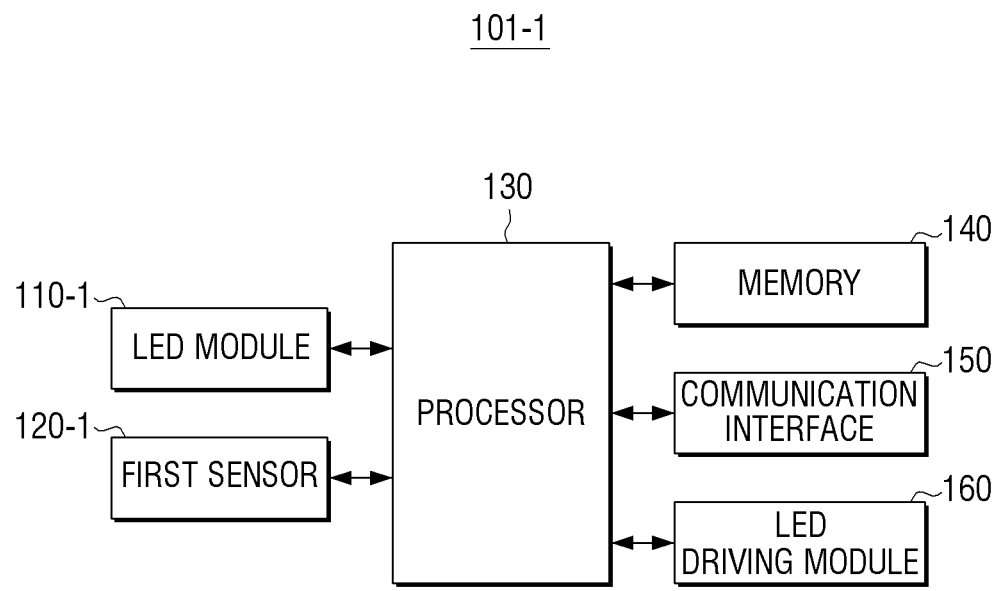
FIG. 3 is a block diagram provided to describe a detailed configuration of a master display module according to an embodiment.

FIG. 3 is a block diagram provided to describe a detailed configuration of a master display module 101-1 according to an embodiment.

Referring to FIG. 3, the master display module 101-1 includes a light emitting diode (LED) module 110-1, a first sensor 120-1, a processor 130, a memory 140, a communication interface 150 and an LED driving module 160. From the configuration shown in FIG. 3, a detailed description of parts overlapping with the configurations shown in FIG. 2 may not be repeated below.

An LED module 110-1 may be a module including a plurality of LED devices. According to an embodiment, the LED device may be implemented as an RGB LED, and an RGB LED may include a red LED, a green LED and a blue LED. Further, the LED device may further include a White LED in addition to the RGB LED. Moreover, the LED device may be implemented as a micro LED. Herein, the micro LED is an LED of about 5 to 100 micrometer size, and is an ultra small light emitting diode that emits light on its own without a color filter.

The first sensor 120-1 is equipped on the master display module 101-1 and is configured to sense an area adjacent to the master display module 101-1. The first sensor 120-1 may include at least one of an illuminance sensor, a temperature sensor, a humidity sensor, a motion sensor or an Infrared (IR) sensor.

In addition to the above-described sensors, the first sensor 120-1 may also be implemented in various types of sensors such as a proximity sensor, an acceleration sensor, a gyroscope sensor, a geomagnetic sensor, a supersonic wave sensor, and an RF sensor.

The processor 130 (e.g., at least one processor) may be implemented as a timing controller controlling the master display module 101-1. Specifically, the processor 130 may transmit control data received from the external apparatus 200 to the LED driving module 160. In other words, the processor 130 may transmit video data or control data corresponding to each LED module 110-1 to the LED driving module 160.

The memory 140 may store instructions or data related to an operating system (OS) for controlling the overall operation of elements of the display apparatus 100 and elements of the display apparatus 100.

Accordingly, the processor 130 may use the various instructions, data, or the like stored in the memory 140 to control the hardware of the master display module 101-1 or the software elements, process instructions or data received from at least one other element by loading to a volatile memory, and may store various data to a non-volatile memory.

The memory 140 may be implemented as a storage medium of various types. For example, the memory 140 may be implemented as a non-volatile memory device such as a read only memory (ROM), a programmable read only memory (PROM), an erasable programmable read only memory (EPROM) or a flash memory, a volatile memory device such as a random access memory (RAM), or as storage apparatus such as a hard disk or an optical disk.

A communication interface 150 may include circuitry, and is configured to communicate with the external apparatus 200.

The communication interface 150 may, based on a wired or wireless communication method, transmit sensing data to the external apparatus 200, and may receive control data from the external apparatus 200.

According to an embodiment, based on the communication interface 150 using a wired communication, the communication interface 150 may be physically coupled to the external apparatus 200 through a cable, and the communication interface 150 may be implemented as a port equipped on the display apparatus 100. The communication interface 150 according to the control of the processor 130 may transmit sensing data to the external apparatus 200 through an Ethernet communication method, and may receive control data from the external apparatus 200. Herein, a high definition multimedia interface (HDMI) cable, a D-subminiature (D-SUB) cable, a video graphics array (VGA) cable, a V-by-One cable, an optical cable or the like may be used.

According to another embodiment, the communication interface 150 may transmit sensing data to the external apparatus 200 through a wireless communication, and may receive control data from the external apparatus 200. In this case, the communication interface 150 may include a WiFi module, a Bluetooth module, an infrared (IR) module, a local area network (LAN) module, an Ethernet module, or the like. Herein, each communication module may be implemented in at least one hardware chip format. The wireless communication module, other than the above-described communication methods, may include at least one communication chip performing communication according to various wireless communication standards such as Zigbee, universal serial bus (USB), mobile industry processor interface camera serial interface (MIPI CSI), 3rd generation (3G), 3rd generation partnership project (3GPP), long term evolution (LTE), LTE advanced (LTE-A), 4th generation (4G), 5th generation (5G), or the like. However, the above is merely one embodiment, and the communication interface 150 is not limited thereto.

Sensing data and control data may be transmitted through different lines in one cable.

The LED driving module 160 drives the LED module 110-1 according to the control of the processor 130. For example, the LED driving module 160 may apply a driving voltage or allow driving current to flow for driving each self emitting device, for example an LED pixel, constituting the LED module 110-1 according to the control of the processor 130 to drive each LED pixel.

The LED driving module 160 may include a driving module coupled to each LED module 110-1. The LED driving module 160 may transmit control data or video data received from the external apparatus 200 to each LED module 110-1 to perform an operation corresponding to the control data or the video data.

The LED driving module 160 may be implemented as an LED driver.

The LED driving module 160 may be equipped with a power supply to provide power. The power supply is a hardware that converts alternating current (AC) to direct current (DC) for safe use in each LED module 110-1 and supplies power accordingly to each system. The power supply may largely consist of an input electromagnetic wave filter, an AC-DC rectifier, a DC-DC switching converter, an output filter and an output.

Herein, the power supply may be implemented, for example, as a switched mode power supply (SMPS). The SMPS, as a DC stabilizing power apparatus that stabilizes output controlling the on-off time ratio of a semiconductor switch device, may be implemented for high efficiency, in a small form and in light-weight, and may be used in driving each LED module 110-1.

Figure 7:
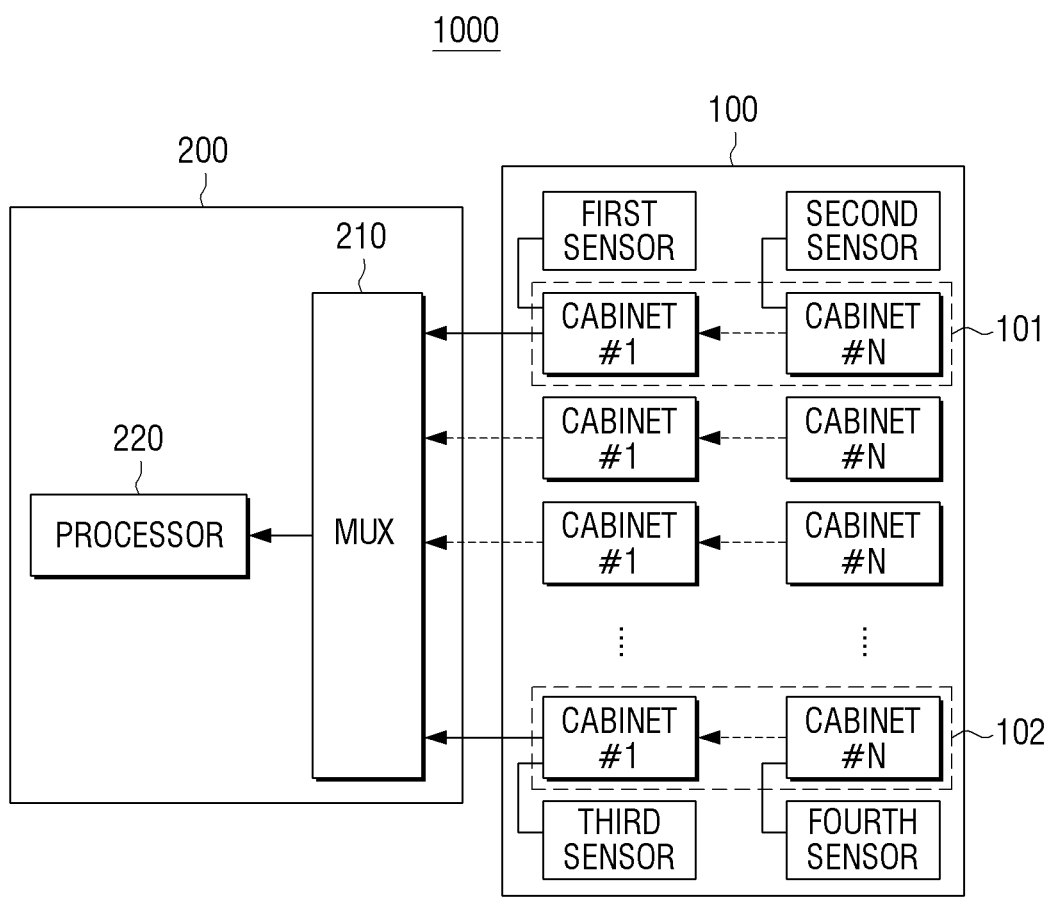
FIG. 7 is a diagram provided to describe a process of an electronic apparatus receiving sensing data from a display apparatus according to an embodiment.

FIG. 7 is a diagram provided to describe a process of an electronic apparatus 200 receiving sensing data from a display apparatus 100 in a display system 1000 according to an embodiment.

Referring to FIG. 7, the electronic apparatus 200 may include a multiplexer 210 and a processor 220.

The multiplexer 210 is configured to include a combinational circuit converting a plurality of input values to an input value. The multiplexer 210 may be referred to as MUX. The multiplexer 210 may also be implemented in a format including a field programmable gate array (FPGA).

The multiplexer 210 according to an embodiment, may receive each sensing data from the master display module in each group of the display apparatus 100. According to FIG. 7, the multiplexer 210 may receive sensing data (hereinafter, first sensing data) obtained from the first sensor 120-1 and sensing data (hereinafter, second sensing data) obtained from the second sensor 120-2 of the master display module in the first group 101, and may receive sensing data (hereinafter, third sensing data) from the third sensor 120-3 and sensing data (hereinafter, fourth sensing data) obtained from the fourth sensor 120-4 from the master display module in the second group 102. The multiplexer 210 may identify the source of each sensing data based on identifying information included in the first to fourth sensing data. Further, the multiplexer 210 may pre-store the arrangement position information of the first to fourth sensors 120-1 to 120-4, and may also identify the position information obtained in the sensing data based on stored arrangement position information.

The multiplexer 210 may then convert the first to fourth sensing data to one sensing data. Specifically, the multiplexer 210 may convert a plurality of sensing data to one sensing data based on the type of sensing data. For example, the multiplexer 210 may, based on the type of sensing data, transmit to the processor 220 the obtained value based on one from an average value, a maximum value or a minimum value of a plurality of sensing data or a sensing data value of a predetermined sensor as sensing data of the display apparatus 100.

By way of example, a case of a plurality of sensors being implemented as at least one of an illuminance sensor, a temperature sensor or a humidity sensor may be assumed. Based on the illuminance sensor being used as an example, the illuminance data sensed from the plurality of sensors disposed in different locations from each other in the display apparatus 100 may be data obtained from the surroundings of each sensor that may have a different value from each other. In this case, the multiplexer 210 may calculate the average value of the first to fourth sensing data, and may use the calculated average value as illuminance data of the display apparatus 100. Specifically, the multiplexer 210 transmits the average illuminance value to the processor 220 and the processor may, based on the average illuminance value, transmit to the display apparatus 100 control data including the luminance information for changing luminance of the display apparatus 100. It is understood, however, that the average value is merely one example, and the multiplexer 210 may transmit the maximum value or minimum value from the first to fourth sensing data or sensing data obtained from the predetermined sensor to the processor 220.

In addition, in the case of a temperature sensor, the multiplexer 210 may calculate the average value of the first to fourth sensing data, and may transmit to the processor 220 the calculated average value as temperature data of the display apparatus 100.

The processor 220 may, based on the transmitted temperature data being greater than or equal to a predetermined temperature value, transmit to the display apparatus 100 control data including a control signal that reduces the luminance value of the display apparatus 100. The temperature value sensed in the display apparatus 100 corresponds to the temperature value of the LED device included in the display module, and an error in the LED device may be generated due to a high temperature value of the LED device. Further, based on the temperature of the LED device being high, the luminance may be reduced. Accordingly, the processor 220 may, based on the temperature value included in the temperature data transmitted from the multiplexer 210 being greater than or equal to a predetermined temperature value, transmit to the display apparatus 100 control data for reducing a luminance value to reduce temperature of the LED device.

In addition, in the case of the illuminance sensor, the multiplexer 210 may calculate the average value of the first to fourth sensing data, and transmit to the processor 220 the calculated average value as the illuminance data of the display apparatus 100.

The processor 220 may, based on the transmitted illuminance data being greater than or equal to the predetermined illuminance value, limit the luminance value of the display apparatus 100 or transmit control data adjusting the time to reach the target luminance to the display apparatus 100. The illuminance value sensed in the display apparatus 100 corresponds to the humidity value of the surroundings of the LED device included in the display module, and based on the LED device outputting a high luminance in a highly humid environment, an error such as a short in the LED device may be generated. Accordingly, the processor 220 may, based on the humidity value included in the humidity data transmitted from the multiplexer 210 being greater than or equal to a predetermined humidity value, limit the maximum luminance value of the display apparatus 100 or transmit to the display apparatus 100 control data increasing the time until reaching the target luminance.

According to another example, assuming a case of the plurality of sensors being implemented as an IR sensor, a control signal received from a remote control apparatus to the IR sensor may be the same. For example, based on a control signal transmitted from a remote control apparatus being a volume up signal of the display apparatus 100, the plurality of IR sensors may receive the same control signal from the remote control apparatus. Accordingly, the multiplexer 210 may only transmit one sensing data from the first to fourth sensing data to the processor 220. Thereafter, the processor 220 may transmit control data including the volume up information to the display apparatus 100.

The average value of the first to fourth sensing data obtained from the illuminance sensor being used as the illuminance value of the display apparatus 100 is assumed, but based on the difference in illuminance value included in the first to fourth sensing data being greater than or equal to a threshold value, an average value may not be calculated and each sensing data is used in this case. Accordingly, the processor 220 may transmit control data including different luminance information of the respective areas each sensor is disposed to the display apparatus 100. For example, based on sunlight being strong on a part of the areas of the display apparatus 100, the processor 220 may transmit a control signal for a relatively significant increase in the luminance value of the respective area to the display apparatus 100.

The example of the multiplexer 210 according to the type of each sensing data changing the plurality of sensing data to one sensing data has been described, but this is merely one example and it is understood that one or more other embodiments are not limited thereto. For example, in the case of the temperature sensor, the multiplexer 210 may not use the average value of the sensing data and may select only sensing data of the predetermined sensor to transmit to the processor 220.

In FIG. 7, a case of each of the master display module and the plurality of slave display modules being implemented as an LED cabinet is assumed.

In addition, the master display module of the remaining groups in addition to the first group 101 and the second group 102 may transmit various data to the multiplexer 210.

Operation according to sensing data of a motion sensor is described in detail below with reference to FIG. 8.

Figure 8:
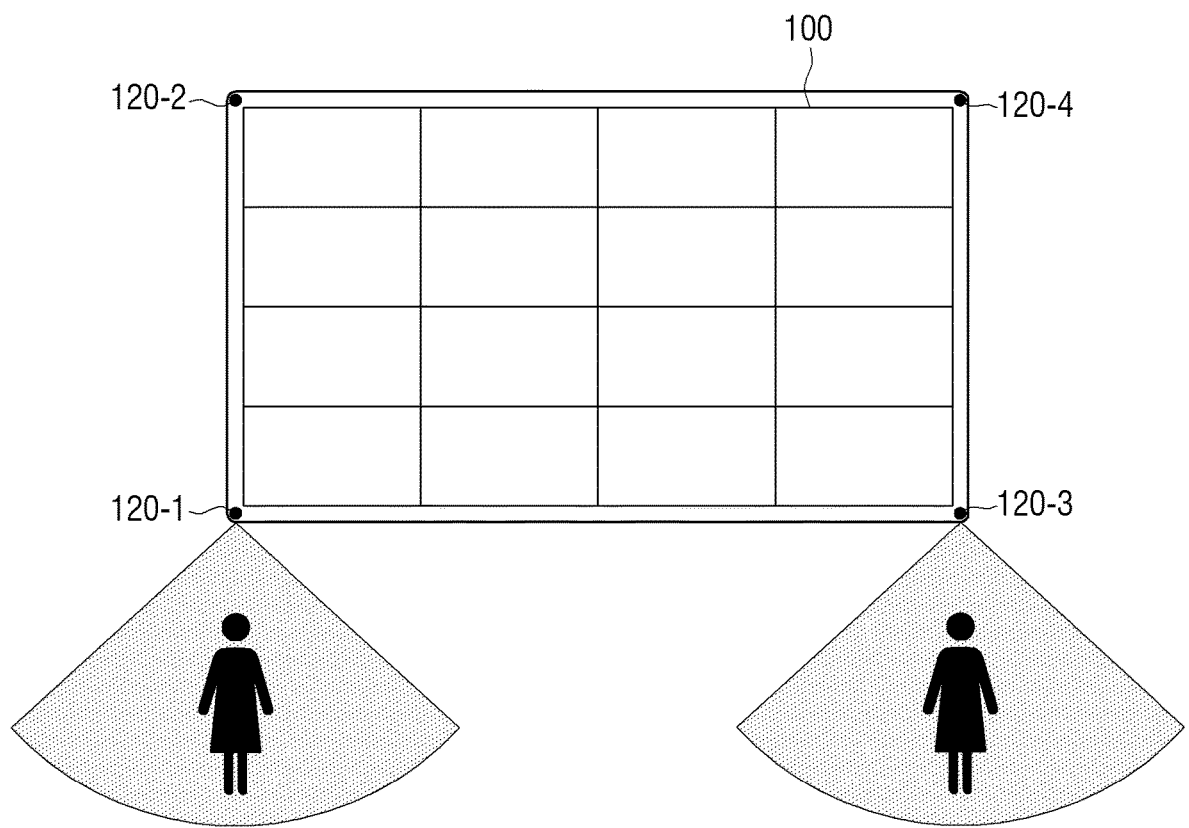
FIG. 8 is a diagram provided to describe a case of a user being detected in the surroundings of a display apparatus according to an embodiment.

FIG. 8 is a diagram provided to describe a case of a user being detected in the surroundings of a display apparatus 100 according to an embodiment.

Referring to FIG. 8, the display apparatus 100 may include a plurality of motion sensors 120-1, 120-2, 120-3 and 120-4.

As described above, each of the plurality of motion sensors 120-1, 120-2, 120-3 and 120-4 may be disposed in different positions from each other. Considering that the display apparatus 100 according to an embodiment may be implemented as a large format display apparatus, by having a plurality of motion sensors 120-1, 120-2, 120-3 and 120-4 being disposed at different areas from each other such as described above, the display apparatus 100 has the effect of detecting a user in the surroundings (surrounding area) of the display apparatus 100 without blind spots, in which a user in the surroundings of the display apparatus 100 is not detected.

Based on user movement in the surroundings of the display apparatus 100 being detected by one or more motion sensors, the sensing data may be transmitted to the electronic apparatus 200 according to the above-described method. The multiplexer 210 may, based on data being identified as or indicating a user being detected from at least one of the first to fourth sensing data, transmit information of a user movement being detected to the processor 220. In this case, the processor 220 may transmit control data for changing a mode of the display apparatus 100 to the display apparatus 100. For example, based on user movement detection information detected when the display apparatus 100 is in a turned off state being included in or with sensing data, the processor 220 may transmit to the display apparatus 100 control data for converting the display apparatus 100 of a turned off state to a standby mode. Herein, a standby mode is a mode for preparing a pre-activation, and may be a mode of state in which power is applied to hardware elements excluding the display of the display apparatus 100. Based on the display mode not having power applied to the display, the display apparatus 100 may be shown as a turned off state externally. In the standby mode, however, the display apparatus 100 may promptly perform an operation corresponding to a control instruction based on the user transmitting a control signal to the display apparatus 100 through a remote control apparatus or the like. For example, based on a turn on instruction being received, the display apparatus 100 that is in a standby mode may promptly turn on the display.

Based on a first sensing data including (e.g., indicating) the user movement detected information from the first sensor 120-1 being transmitted to the processor 220 prior to the third sensing data including the user movement detected information from the third sensor 120-3, the processor 220 may identify that the user has moved from the left side to the right side in FIG. 8. Accordingly, the processor 220 may transmit to the display apparatus 100 a video data displaying a dynamic image based on the user movement direction.

Based on identifying that the user has moved from the left side to the right side according to the first sensing data and the third sensing data, the processor 220 may transmit (e.g., control to transmit) to the display apparatus 100 a video data to display an image of moving from a left side to right side.

In FIG. 8, a case of the motion sensors being implemented as four motion sensors is assumed and illustrated, but this is merely one example and it is understood that one or more other embodiments are not limited thereto. For example, according to another embodiment, only two motion sensors may be disposed on the bottom end of the display apparatus 100 and no sensors may be disposed on the top end (e.g., where the scale of the display apparatus 100 is such so as to not be able to detect user movement due to the high position thereof).

Figure 9:
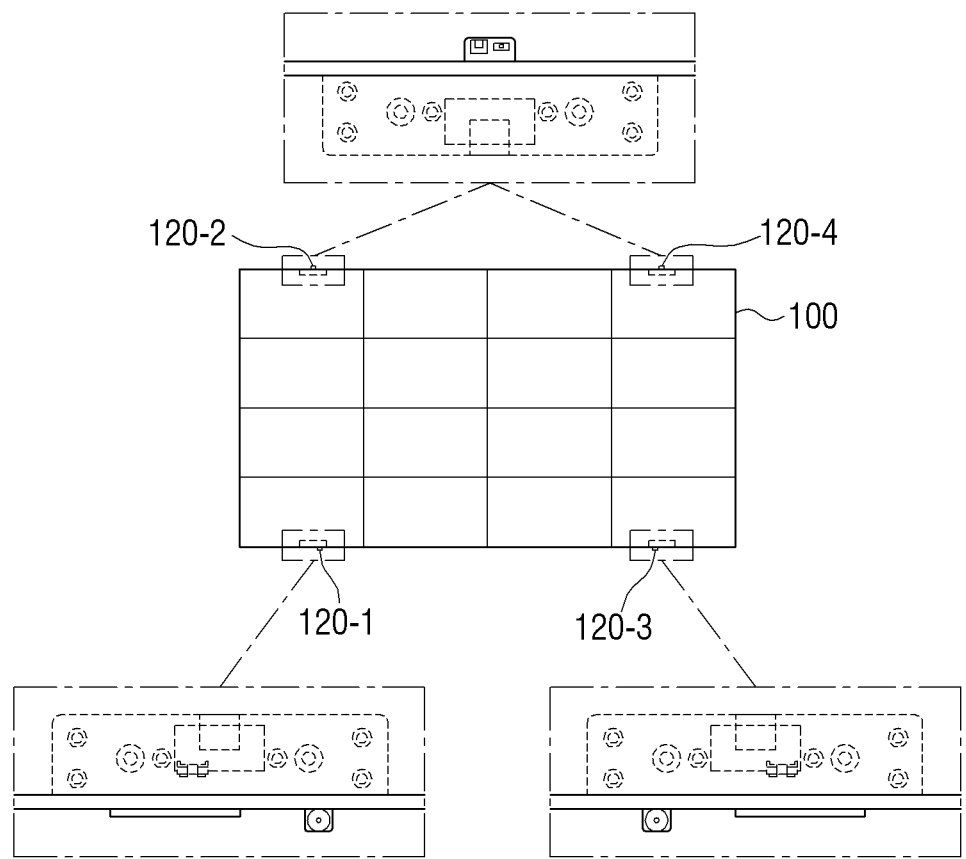
FIG. 9 is a layout diagram of a plurality of sensors according to an embodiment.

FIG. 9 is a layout diagram of a plurality of sensors 120-1, 120-2, 120-3 and 120-4 according to an embodiment.

Referring to FIG. 9, each of the plurality of sensors 120-1, 120-2, 120-3 and 120-4 may be positioned on display modules disposed at the outermost parts of the display apparatus 100 toward the top/bottom, left/right directions thereof.

In addition, each of the plurality of sensors 120-1, 120-2, 120-3 and 120-4 may include at least one of an illuminance sensor, a temperature sensor, a humidity sensor, a motion sensor or an Infrared (IR) sensor, and each sensor 120-1, 120-2, 120-3 and 120-4 may include a sensor of a different type from each other.

For example, the first sensor 120-1 and the third sensor 120-3 disposed on the bottom end may include a motion sensor but the second sensor 120-2 and the fourth sensor 120-4 disposed on the top end may not include a motion sensor.

The plurality of sensors 120-1, 120-2, 120-3 and 120-4 have been described as being positioned in a display module disposed at the outermost sides, but this is merely one example, and may be disposed at other positions in one or more other embodiments.

Figure 10:
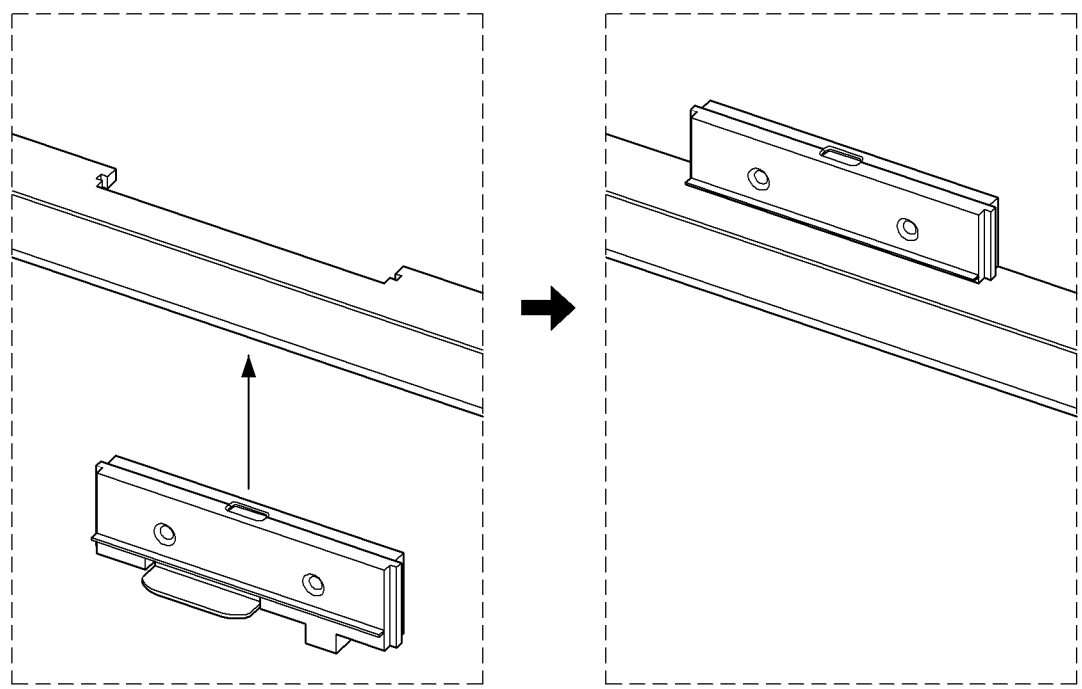
FIG. 10 is a diagram provided to describe an installation method of a sensor according to an embodiment.

FIG. 10 is a diagram provided to describe an installation method of a sensor according to an embodiment.

Referring to FIG. 10, each sensor may be installed according to a hook fixed structure on the corresponding display module. Specifically, the first sensor 120-1 may be installed on the master display module as a hook fixed structure, and the second sensor 120-2 may be installed on the last slave display module as a hook fixed structure.

In addition, each sensor, based on being installed on the display module in a hook fixed structure, may be attachable to and detachable from each display module.

Additionally or alternatively, each sensor may be installed on a corresponding display module using magnetic properties. It is understood that various embodiments may implement various methods of attaching the sensor to the corresponding display module, and are not limited to the hook fixed structure and/or the magnetic properties.

Figure 11:
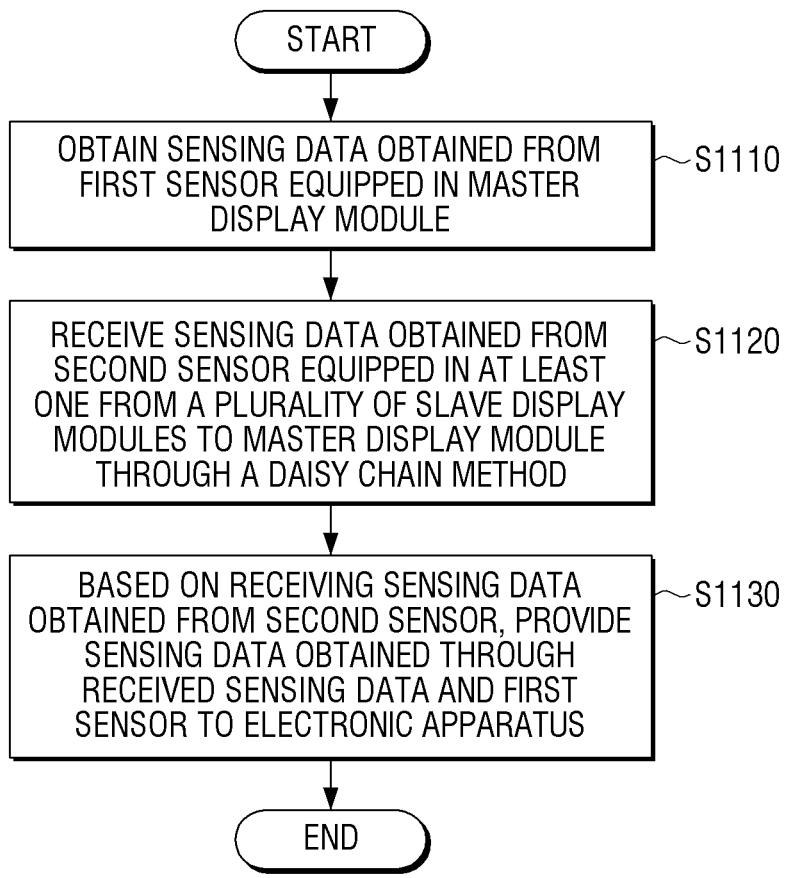
FIG. 11 is a flowchart provided to describe a control method of a display apparatus including a display equipped with a master display module and a plurality of slave display modules coupled by a Daisy Chain method according to an embodiment.

FIG. 11 is a flowchart provided to describe a control method of a display apparatus 100 including a display equipped with a master display module and a plurality of slave display modules coupled by a Daisy Chain method according to an embodiment.

The display apparatus 100 may include a plurality of display groups respectively including a master display module and a plurality of slave display modules, and each master display module and at least one slave display module included in at least one from among the plurality of display groups may be equipped with a sensor, and each master display module and slave display module included in at least one other display group from among the plurality of display groups may not be equipped with a sensor.

Herein, the display modules included in a first group from among the plurality of display groups is disposed on one corner area of the display apparatus 100, the display modules included in the second group from among the plurality of display groups is disposed on a different corner area opposite the one corner, and each of the master display module and last least one slave display module included in the first group and the second group may be equipped with a sensor.

The display apparatus 100 may obtain sensing data obtained from a first sensor 120-1 equipped in the master display module (operation S1110).

Specifically, the display apparatus 100 may store sensing data obtained by the master display module from the first sensor 120-1.

The display apparatus 100 may receive sensing data obtained, by the master display module through a Daisy Chain method, from the second sensor 120-2 equipped in at last one from among the plurality of slave display modules (operation S1120).

Specifically, the display apparatus 100 may transmit a request signal for sensing data obtained from the second sensor 120-2 to at least one slave display module at a first time interval, and store the received sensing data from at least one of the slave display modules in the master display module.

The display apparatus 100 may, based on sensing data obtained from the second sensor 120-2 being received, provide the received sensing data and sensing data obtained through the first sensor 120-2 to the electronic apparatus 200 (operation S1130).

Specifically, the display apparatus 100 may, based on receiving, from the electronic apparatus 200 at a second time interval, a request signal for sensing data obtained from the first sensor 120-1 and the second sensor 120-2, transmit the stored sensing data to the electronic apparatus 200. Herein, the first time interval may be equal to or shorter than the second time interval.

The display apparatus 100 may store sensing data obtained from the first sensor 120-1 to a first area of the memory included in the master display module, and may store sensing data received from at least one slave module to a second area of the memory.

The display apparatus 100 may then identify sensing data stored in the first area and the second area as sensing data corresponding to the first sensor 120-1 and the second sensor 120-2, respectively, and provide the same to the electronic apparatus 200.

The first sensor 120-1 and the second sensor 120-2 described above may include at least one of an illuminance sensor, a temperature sensor, a humidity sensor, a motion sensor or an Infrared (IR) sensor. Sensing data obtained from the first sensor 120-1 and the second sensor 120-2 may include at least one of illuminance data, temperature data, humidity data, motion data or IR data.

In addition, each sensing data obtained from the first sensor 120-1 and the second sensor 120-2 may include identifying information of the first sensor 120-1 or the second sensor 120-2.

The first sensor 120-1 and the second sensor 120-2 respectively may be a sensor attachable to or detachable from the master display module or at least one slave display module.

Each of the master display module and the plurality of slave display modules described above may be implemented as an LED cabinet including a plurality of light emitting diode (LED) devices.

Methods according to various embodiments described above may be implemented in the form of an installable application to a related art display apparatus.

In addition, methods according to various embodiments described above may be implemented as only a software upgrade or a hardware upgrade on a related art display apparatus.

Furthermore, various embodiments described above may be performed through an embedded server equipped on the display apparatus or through at least one external server from the display apparatus.

One or more embodiments may be implemented with software including instructions stored in the storage medium readable by a machine (e.g., a computer). The machine, as an apparatus capable of calling the stored instructions from the storage media and operating according to the called instructions, may include a display apparatus according to disclosed embodiments. Based on instructions being executed by the processor, the processor may directly, or using other elements under the control of the processor, perform functions corresponding to the instructions. The instructions may include a code generated or executed by a compiler or an interpreter. The machine-readable storage media may be provided in the form of a non-transitory storage media. Here, the term "non-transitory" merely means that the storage medium is tangible and does not include a signal, and does not distinguish that data is permanently or temporarily stored in the storage medium.

According to an embodiment, the method according to one or more embodiments may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g., PLAYSTORE™). In the case of on-line distribution, at least a portion of the computer program product may be at least temporarily stored in a storage medium such as a manufacturer's server, a server of an application store, or a memory of a relay server, or temporarily generated.

In addition, according to an embodiment, various embodiments may be implemented in a computer or in a recording medium capable of being read by a similar apparatus using a software, a hardware or a combination of software and hardware. In some cases, embodiments described herein may be implemented as a processor itself. Based on a software implementation, embodiments according to the process and function described in the present disclosure may be implemented as separate software modules. Each of the software modules may perform one or more functions or operations described in or understandable from the present disclosure.

The computer instructions for performing a processing operation of another apparatus according to various embodiments may be stored in a non-transitory computer-readable medium. The computer instructions stored in the non-transitory computer-readable medium, based on being executed by the processor of a specific device, may have a specific device perform a processing operation of another device according to various embodiments.

The non-transitory computer readable medium refers to a medium that stores data semi-permanently rather than storing data for a very short time, such as a register, a cache, a memory, etc., and is readable by an apparatus. Specific examples of a non-transitory computer-readable medium may include a compact disc (CD), a digital versatile disc (DVD), a hard disc, a Blu-ray disc, a universal serial bus (USB), a memory card, a read only memory (ROM), and the like.

In addition, each element (e.g., a module or a program) according to various embodiments may be composed of a single entity or a plurality of entities, and some sub-elements from the abovementioned sub-elements may be omitted, or another sub-element may be further included in various embodiments. Alternatively or additionally, some elements (e.g., modules or programs) may be integrated into one entity to perform the same or similar functions performed by each respective element prior to integration. The operations performed by a module, a program, or other element, in accordance with various embodiments, may be executed sequentially, in parallel, repetitively, or in a heuristic manner, or at least some operations (triggers) may be executed in a different order, omitted, or a different operation may be included.

While the present disclosure has been shown and described with reference to embodiments thereof, the disclosure is not limited to specific embodiments or the drawings, and it will be understood by those of ordinary skill in the art that various changes in form and details may be made therein without departing from the spirit and scope as defined, and these changes in form and details are not be understood as individual from the technical idea or scope of the present disclosure.

What is claimed is:

1. A display apparatus, comprising:
   a first display group comprising a first master display module and a plurality of first slave display modules coupled by a Daisy Chain method;
   a first sensor equipped on the first master display module;
   a second sensor equipped on at least one of the plurality of first slave display modules; and
   a processor comprised in the first master display module, wherein the processor is configured to:
      obtain first sensing data from the first sensor,
      control to transmit a request signal for second sensing data obtained from the second sensor; and
      based on the request signal transmitted, obtain the second sensing data from the second sensor, and
   wherein the at least one of the plurality of first slave display modules on which the second sensor is equipped is a first slave display module that receives the request signal through the Daisy Chain method from among the plurality of first slave display modules.

2. The display apparatus of claim 1, further comprising:
   a second display group comprising a second master display module and a plurality of second slave display modules, wherein the second master display module and the plurality of second slave modules are not equipped with a sensor.

3. The display apparatus of claim 2, further comprising:
a third display group comprising a third master display module and a plurality of third slave display modules;
a third sensor equipped on the third master display module; and
a fourth sensor equipped on at least one of the plurality of third slave display modules,
wherein the first display group and the third display group are arranged on opposite edge areas of the display apparatus.

4. The display apparatus of claim 1, wherein the first master display module comprises:
a memory; and
the processor,
wherein the processor is further configured to:
control to store the first sensing data obtained from the first sensor in the memory,
control to transmit a request signal for the second sensing data obtained from the second senor to at least one of the first slave display modules at a first time interval, and
control to store the received second sensing data in the memory.

5. The display apparatus of claim 4, wherein:
the processor is further configured to, based on receiving from an external apparatus at a second time interval a request signal for sensing data, control to transmit the stored first sensing data and the stored second sensing data to the external apparatus, and
wherein the first time interval is equal to or shorter than the second time interval.

6. The display apparatus of claim 4, wherein the processor is further configured to:
control to store the first sensing data obtained from the first sensor in a first area of the memory;
control to store the received second sensing data in a second area of the memory; and
provide, to an external apparatus, identification of the first sensing data stored in the first area as sensing data corresponding to the first sensor and the second sensing data stored in the second area as sensing data corresponding to the second sensor.

7. The display apparatus of claim 1, wherein:
the first sensor and the second sensor comprise at least one of an illuminance sensor, a temperature sensor, a humidity sensor, a motion sensor or an Infrared (IR) sensor; and
the first sensing data and the second sensing data comprise at least one of an illuminance data, a temperature data, a humidity data, a motion data or an IR data.

8. The display apparatus of claim 1, wherein the first sensing data comprises identification information of the first sensor and the second sensing data comprises identification information of the second sensor.

9. The display apparatus of claim 1, wherein the first sensor is attachable to and detachable from the first master display module, and the second sensor is attachable to and detachable from the at least one of the plurality of first slave display modules.

10. The display apparatus of claim 1, wherein each of the first master display module and the plurality of first slave display modules is implemented as a light emitting diode (LED) cabinet comprising a plurality of LED devices.

11. A control method of a display apparatus comprising a first display group including a first master display module and a plurality of first slave display modules coupled by a Daisy Chain method, the control method comprising:
obtaining first sensing data through a first sensor equipped in the first master display module;
transmitting a request signal for second sensing data obtained from a second sensor; and
based on the request signal transmitted, obtaining the second sensing data from the second sensor equipped in a first slave display module that receives the request signal through the Daisy Chain method from among the plurality of first slave display modules.

12. The control method of claim 11, wherein:
the display apparatus further comprises a second display group comprising a second master display module and a plurality of second slave display modules; and
the second master display module and the plurality of second slave modules are not equipped with a sensor.

13. The control method of claim 12, wherein:
the display apparatus further comprises a third display group comprising a third master display module and a plurality of third slave display modules, a third sensor equipped on the third master display module, and a fourth sensor equipped on at least one of the plurality of third slave display modules; and
the first display group and the third display group are arranged on opposite edge areas of the display apparatus.

14. The control method of claim 11, wherein:
the obtaining the first sensing data comprises storing the first sensing data in the master display module; and
the receiving the second sensing data comprises:
transmitting a request signal for the second sensing data obtained from the second sensor to at least one of the first slave display modules at a first time interval, and
storing the received second sensing data in the master display module.

15. A master display module comprising:
a first sensor;
a memory storing at least one instruction; and
a processor configured to execute the at least one instruction to:
obtain first sensing data through the first sensor,
transmit a request signal for second sensing data obtained from a second sensor, and
based on the request signal transmitted, obtain the second sensing data from the second sensor, through a Daisy Chain method,
wherein a first slave display module on which the second sensor is equipped is a slave display module that receives the request signal through the Daisy Chain method from among a plurality of slave display modules.

16. The master display module of claim 15, wherein the first sensor that is an attachable and detachable sensor.

17. The master display module of claim 15, wherein the processor is further configured to execute the at least one instruction to:
control to store the first sensing data obtained from the first sensor in the memory,
control to transmit the request signal for the second sensing data to the first slave display module at a first time interval, and
control to store the received second sensing data in the memory.

18. The master display module of claim 17, wherein:
the processor is further configured to execute the at least one instruction to, based on receiving from an external apparatus at a second time interval a request signal for sensing data, control to transmit the stored first sensing data and the stored second sensing data to the external apparatus; and
the first time interval is equal to or shorter than the second time interval.

19. The master display module of claim 17, wherein the processor is further configured to:
control to store the first sensing data obtained from the first sensor in a first area of the memory;
control to store the received second sensing data in a second area of the memory; and
provide, to an external apparatus, identification of the first sensing data stored in the first area as sensing data corresponding to the first sensor and the second sensing data stored in the second area as sensing data corresponding to the second sensor.

20. The master display module of claim 15, wherein the first sensing data comprises identification information of the first sensor and the second sensing data comprises identification information of the second sensor.

* * * * *